United States Patent
Fernando et al.

(10) Patent No.: US 6,704,795 B1
(45) Date of Patent: Mar. 9, 2004

(54) TECHNIQUE FOR REDUCING CONSUMPTION OF ROUTER RESOURCES AFTER BGP RESTART

(75) Inventors: Rex Emmanuel Fernando, San Jose, CA (US); Yakov Rekhter, New Rochelle, NY (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/416,461

(22) Filed: Oct. 12, 1999

(51) Int. Cl.[7] .................... G06F 15/16; G06F 15/173
(52) U.S. Cl. .................... 709/237; 709/238; 709/242
(58) Field of Search ...................... 709/238, 237, 709/242, 230, 203, 231, 249, 241, 228, 220, 229, 207, 226; 370/353, 409, 369, 390, 230, 392, 408, 218, 248; 705/1, 5, 26; 455/406, 415, 413, 461; 712/25, 26, 235, 16, 18, 21, 22, 20, 117; 714/11

(56) References Cited

U.S. PATENT DOCUMENTS

| | | | | |
|---|---|---|---|---|
| 4,851,988 A | * | 7/1989 | Trottier et al. | 709/226 |
| 5,371,896 A | * | 12/1994 | Gove et al. | 712/20 |
| 6,301,609 B1 | * | 10/2001 | Aravamudan et al. | 707/1 |
| 6,392,997 B1 | * | 5/2002 | Chen | 370/252 |
| 6,553,423 B1 | * | 4/2003 | Chen | 709/230 |

OTHER PUBLICATIONS

George Sackett, Cisco Router Handbook, McGraw–Hill, 2000, p.526–531.*
Paul Ammann, Cisco Router Internetworking, McGraw–Hill, 2000.*
Yakov Rekhter, et al., *A Border Gateway Protocol 4 (BGP–4)*, Network Working Group, rfc1771, Mar. 1995, pp. 1–47.
Tony Bates, et al., *Multiprotocol Extensions for BGP–4*, Network Working Group, 1999, pp. 1–10.
Enke Chen, *Route Refresh Capability for BGP–4*, Network Working Group, 1999, pp. 1–4.
Ravi Chandra, et al., *Capabilities Negotiation with BGP–4*, Network Working Group, 1999, pp. 1–4.
*Network Protocols Configuration Guide, Part 1*, Cisco IOS Release 11.3, Copyright 1997, pp. P1C–160–P1C–161.
Optimized Engineering Corporation, *Understanding Routing With IP*, World Wide Web page http://www.optimized.com/COMPENDI/IP–Routg.htm, pp. 1–3. Sep. 1999.
World Wide Web page http://www.cisco.com/univercd/cc/t . . . s120/12cgcr/np1_c/1cprt1/1cbgp.htm, *Configuring BGP*, pp. 1–44. Feb., 1999.
Yakov Rekhter, et al., *A Border Gateway Protocol 4 (BGP–4)*, Network Working Group, Aug. 1998, pp. 1–54.
Radia Perlman, *Interconnections Bridges and Routers*, Copyright 1992, pp. 323–329.

* cited by examiner

*Primary Examiner*—Zarni Maung
*Assistant Examiner*—Kenny Lin
(74) *Attorney, Agent, or Firm*—Cesari and McKenna, LLP (57) ABSTRACT

A technique reduces consumption of resources on behalf of a router and its neighboring routers by deferring the point at which the router renders a route selection decision in accordance with a Border Gateway Protocol (BGP). A BGP KEEPALIVE message is selectively issued to enable the router to detect that each of its neighbors has finished sending all of its routes. After detecting that it has received a full set of routes from each neighbor, the router performs route selection procedures to select the preferred routes and advertises these routes to its neighbors.

27 Claims, 4 Drawing Sheets

TECHNIQUE FOR REDUCING CONSUMPTION OF ROUTER RESOURCES AFTER BGP RESTART

FIELD OF THE INVENTION

This invention relates generally to computer networks and, more particularly, to the efficient deployment of router resources when rendering route selection decisions after restarts in a computer network.

BACKGROUND OF THE INVENTION

A computer network is a geographically distributed collection of interconnected communication links for transporting data between nodes, such as computers. Many types of computer networks are available, with the types ranging from local area networks (LANs) to wide area networks (WANs). The nodes typically communicate by exchanging discrete frames or packets of data according to predefined protocols. In this context, a protocol consists of a set of rules defining how the nodes interact with each other.

Computer networks may be further interconnected by an intermediate node, called a router, to extend the effective "size" of each network. Since management of a large system of interconnected computer networks can prove burdensome, small groups of computer networks may be maintained as autonomous systems or routing domains. The networks within a routing domain are typically coupled together by conventional "intradomain" routers. Yet it still may be desirable to increase the number of nodes capable of exchanging data; in this case, "interdomain" routers executing interdomain routing protocols are used to interconnect nodes of the various autonomous systems. An example of an interdomain routing protocol is the Border Gateway Protocol (BGP) which performs routing between autonomous systems by exchanging routing and reachability information among the interdomain routers of the systems. The interdomain routers configured to execute the BGP protocol, called BGP routers, maintain routing tables, transmit routing update messages and render routing selection decisions based on routing metrics.

Specifically, each BGP router maintains a routing table that lists feasible paths to a particular destination. Periodic refreshing of the routing table is generally not performed; however, BGP peer routers residing in the autonomous systems exchange routing information under certain circumstances. For example, when a BGP router initially connects to the network, the peer routers exchange the entire contents of their routing tables with that router. Thereafter when changes occur to those contents, the routers exchange only those portions of their routing tables that change in order to update their peers' tables. These update messages, which are sent in response to routing table changes, advertise routing changes with respect to a particular destination. The BGP routing protocol is well-known and described in detail in *Request for Comments* (RFC) 1771, by Y. Rekhter and T. Li (1995), and *Interconnections, Bridges and Routers*, by R. Pearlman, published by Addison Wesley Publishing Company, at pages 323–329 (1992), all disclosures of which are hereby incorporated by reference.

Broadly stated, a BGP router generates routing update messages for a neighboring peer router by "walking-through" the routing table and applying appropriate routing policies. A routing policy is information that enables a BGP router to rank routes according to filtering and preference (i.e., the "preferred" route). Routing updates provided by the update message allow BGP routers of the autonomous systems to construct a consistent view of the network topology. The update messages are sent using a reliable transport, such as the Transmission Control Protocol (TCP), to ensure reliable delivery. TCP is a transport protocol implemented by a transport layer of the Internet Protocol (IP) architecture; the term TCP/IP is commonly used to denote this architecture. The TCP/IP architecture is well known and described in *Computer Networks, 3rd Edition*, by Andrew S. Tanenbaum, published by Prentice-Hall (1996).

After the TCP transport connection is established, the neighboring BGP routers exchange various messages defined by the BGP protocol; in particular, the routers exchange conventional BGP OPEN and KEEPALIVE messages. The OPEN message sets forth parameters that allow the routers to identify themselves and to negotiate various exchange parameters, whereas the initial KEEPALIVE message transfer typically confirms acceptance of the OPEN message exchange. As used herein, the term restart denotes establishment of a reliable peer connection between the neighboring routers.

Upon a restart, the initial transfer among the BGP neighbors involves an exchange of their entire or "full" BGP routing tables. A full routing table exchange comprises the transfer of a complete set of preferred paths to each destination stored in each neighbor's BGP routing table. In addition to the routing table, each router contains a forwarding table that controls forwarding of packets to, e.g., a next hop. The routing table is used to construct the forwarding table and, as described herein, router resources are required to update those tables.

The initial transfer of the routing table is realized through the use of one or more BGP UPDATE messages. The conventional UPDATE message is generally used to advertise a current route of a neighboring router; as a result, each UPDATE message issued by a BGP neighboring router subsequent to the initial routing information exchange is an incremental update that comprises advertisement of only one or a subset of the preferred paths. The same UPDATE message format is used to exchange both the initial BGP routing table and any incremental changes to that table.

After confirming the OPEN message exchange during the restart, the KEEPALIVE message is periodically issued by a sending peer router to ensure that the receiving peer router "knows" that the sender is alive. Although a router may send KEEPALIVE messages in addition to UPDATE messages, a neighbor that has routes to advertise may send the UPDATE message in lieu of the KEEPALIVE message. Receipt of an UPDATE message by the receiving peer router is, however, an indication that the sending peer router is alive and, thus, obviates the need to send the periodic KEEPALIVE message. A hold time value (i.e., "hold-down timer") contained in the OPEN message defines a maximum time period (e.g., number of seconds) that may elapse between receipt of successive KEEPALIVE and/or UPDATE messages by a neighbor.

Once a BGP router receives routing information via the UPDATE message, it performs a BGP route selection process to determine if the newly received route is preferred to the currently used route. That is, the router compares the newly received route to a destination (stored in the message) with the contents of its routing table by essentially "walking-through" the routing table to locate a route that has the same destination as the new route. Upon finding a match, the router applies the predetermined routing policy to determine which route is preferred by ranking the routes according to local criteria of the router. The local criteria are preferably based on predetermined preference and filtering parameters; for example, the preferred route may be determined based on the length of an autonomous system path. If the new route is preferred to the route stored in the routing table, the router completes the route selection process by updating its forwarding table with the new route and advertising that route to its neighbors, subject to the hold-down timer.

A problem with this conventional approach is that after a restart, the router may receive routing table updates to the same destination from the many different neighbors. For example, assume that router A has three neighbors N1–N3, each of which has a route to a destination D. From A's point of view, the preferred route is the route advertised (via the UPDATE message) by N1, the next preferred route is the route advertised by N2 and the least preferred route is the route advertised by N3. However, the UPDATE messages received by A from N1–N3 may arrive in various sequences. For example, a first scenario may comprise A initially receiving an UPDATE message from N1, and then from N2 and N3. Since the route to D advertised by N1 is the first route received by A, router A selects that route as the preferred route. Consequently, A loads this route into its routing table, updates its forwarding table with this route and advertises it to its neighbors as the "preferred" route.

Upon receiving an UPDATE message containing the route to D advertised by N2, A "walks" its routing table and finds (as a match to D) the route advertised by N1. Router A compares the two routes according to its local criteria and determines that the route from N2 is no better than the route from N1. Accordingly, router A loads the route from N2 into its routing table, but does not update its forwarding table with that route because the route advertised by N1 is the preferred route. Furthermore, router A does not issue an update to its neighbors for the route from N2. Router A then receives an UPDATE message containing the route advertised by N3, compares that route with the preferred route from N1 stored in its routing table and loads the route advertised by N3 into the routing table. However, A does not update its forwarding table with the route from N3 nor does it generate an UPDATE message for that route because the route from N1 is the preferred route.

A second scenario comprises A first receiving an UPDATE message from N3. Since this is first route to destination D received by A, router A selects this route as its preferred route, updates its routing and forwarding tables with the route and advertises the route from N3 to its neighbors. Router A then receives an UPDATE message from N2 and walks the entire routing table until it discovers a match with the route advertised by N3. Applying the routing policy, A determines that the route from N2 is preferred to the route from N3, so it updates both its routing and forwarding tables with the preferred route from N2, withdraws (either implicitly or explicitly) the route from N3 and instead advertises the route from N2 as the preferred route. Finally, A receives an UPDATE message advertising a preferred route from N1. A walks the routing table, finds a route to D advertised by N2, determines that the route from N1 is preferred, updates its forwarding and routing tables with the preferred route from N1, withdraws the previous route and advertises the new route from N1 as the preferred route.

In the first scenario, router A consumes certain resources when walking the routing table and performing route selection operations. Essentially, router A must execute three (3) independent comparison operations: A must compare the received UPDATE messages, each containing a full set of routes from a neighbor, among themselves whether they are received by A at the same time or at different times. According to the BGP protocol, router A must also update its routing table each time it receives an UPDATE message to establish a record which reflects those routers from which it has received routing updates.

In the second scenario, however, A must update both its routing and forwarding tables in response to each UPDATE message received from its neighbors because each subsequently received "new" route is a preferred route as determined by the route selection process. Moreover, as each new route is selected to be the preferred route, the router A must withdraw the previous route and advertise the preferred route to its neighbors subject to hold-down timer constraints. This scenario results in consumption of substantially more of the router's resources and contributes to overall routing instability since router A has previously advertised irrelevant routing information to its neighbors.

Therefore, the sequence of one or more UPDATE messages received at a router upon a restart has "global" implications in that it may impact additional resources consumed not only at the router, but also at its neighbors. It is thus desirable to provide a technique for reducing resource consumption at a router when performing route selection decisions at restart. In addition, it is desirable to provide a technique for deferring BGP route selection procedures at a BGP router until all routing table updates from all neighboring peer routers have been received at the router.

SUMMARY OF THE INVENTION

The present invention is directed to a technique for reducing consumption of resources on behalf of a router and its neighboring routers in a computer network by deferring the point at which the router renders a route selection decision. The invention generally pertains to full routing table exchanges among the neighboring routers upon a restart. Specifically, the invention pertains to a technique for deferring route selection in accordance with the Border Gateway Protocol (BGP) until all of the BGP neighboring peer routers finish updating the BGP router with their full routing tables. According to the invention, a KEEPALIVE message is selectively issued to enable the router to detect that each of its neighbors has finished sending all of its routes. After detecting that it has received a full set of routes from each neighbor, the router performs route selection procedures to select the preferred routes and advertises these routes to its neighbors.

Since the invention pertains to restarts of BGP peer connections, the technique involves the use of a first KEEPALIVE message exchanged between BGP neighboring peer routers. In particular, a neighbor does not send a first KEEPALIVE message after a restart until it finishes sending all of its full routing table updates to the router. When the neighbor has no further preferred routes to send, i.e., it has finished sending its full routing table, it may send the first KEEPALIVE message to the router.

Deferring issuance of the first KEEPALIVE message does not violate BGP protocol specification; therefore BGP routers that are configured to implement the invention may advantageously interoperate with routers that do not implement the invention. To avoid deferring route selection indefinitely, the invention further comprises use of a specified timer. That is, a BGP router must perform BGP route selection procedures by the specified time period after restart, even if the router detects that not all of its BGP neighbors have completed sending of their routes to the router.

BRIEF DESCRIPTION OF THE DRAWINGS

The above and further advantages of the invention may be better understood by referring to the following description in conjunction with the accompanying drawings, in which like reference numbers indicated identical or functionally similar elements.

DETAILED DESCRIPTION OF AN ILLUSTRATIVE EMBODIMENT

Figure 1:
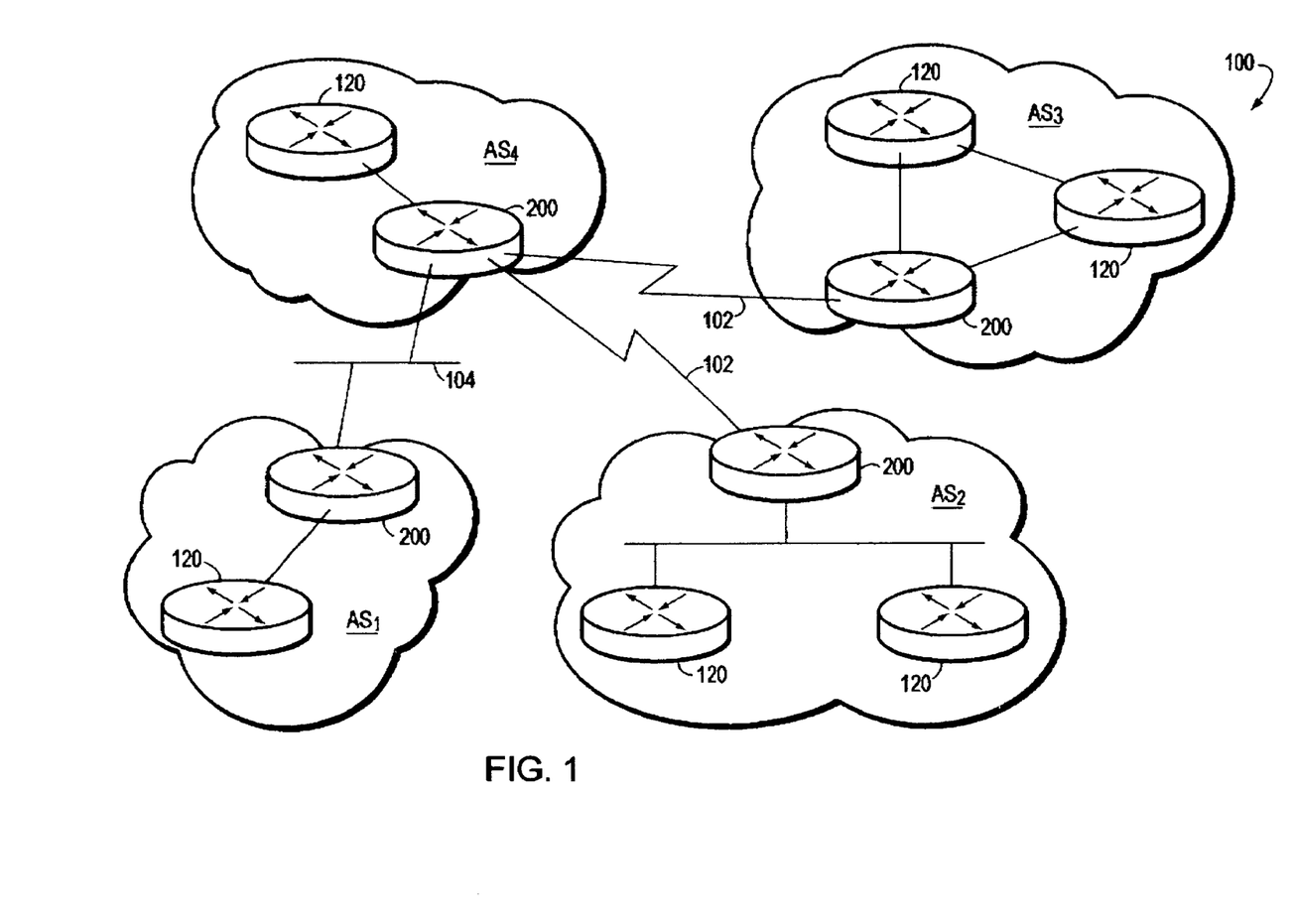
FIG. 1 is a schematic block diagram of a computer network comprising a plurality of autonomous systems or routing domains interconnected by intermediate nodes, such as interdomain routers.

FIG. 1 is a schematic block diagram of a computer network 100 comprising a plurality of autonomous systems or routing domains interconnected by intermediate nodes, such as conventional intradomain routers 120 and interdomain routers 200. The autonomous systems include various routing domains ($AS_{1-4}$) interconnected by the interdomain routers 200. The interdomain routers 200 may be further interconnected by shared medium networks 104, such as local area networks (LANs), and point-to-point links 102 including frame relay links, asynchronous transfer mode links or other serial links. Communication among the routers is typically effected by exchanging discrete data frames or packets in accordance with predefined protocols, such as the Transmission Control Protocol/Internet Protocol (TCP/IP). It will be understood to those skilled in the art that other protocols, such as the Internet Packet Exchange (IPX) protocol, may be advantageously used with the present invention.

Figure 2:
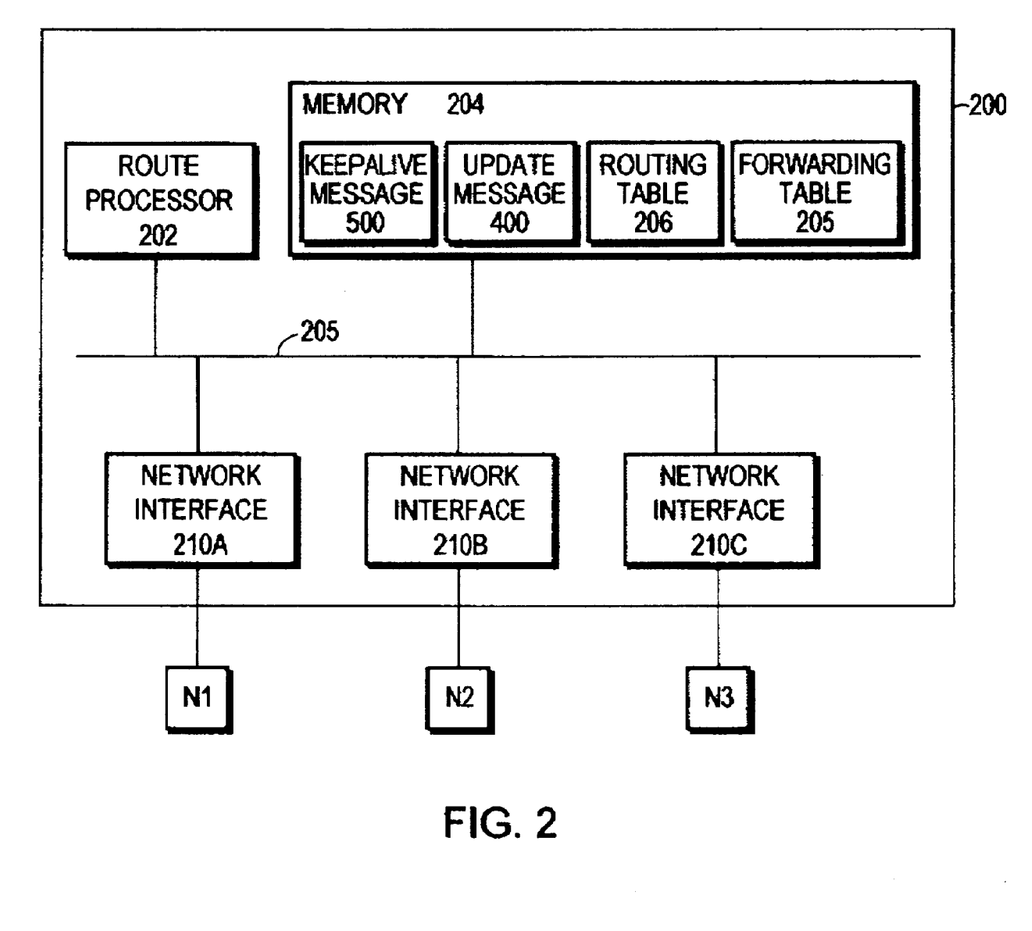
FIG. 2 is a schematic block diagram of an interdomain router comprising a route processor coupled to a memory and a plurality of network interfaces.

Each router typically comprises a plurality of interconnected elements, such as a processor, a memory and a network interface adapter. FIG. 2 is a schematic block diagram of an interdomain router 200 comprising a route processor 202 coupled to a memory 204 and a plurality of network interface adapters $210_{A-C}$ via a bus 205. The memory 204 may comprise storage locations addressable by the processor and interface adapters for storing software programs and data structures associated with the inventive deferment technique. The route processor 202 may comprise processing elements or logic for executing the software programs and manipulating the data structures. An operating system, portions of which are typically resident in memory 204 and executed by the route processor, functionally organizes the router by, inter alia, invoking network operations in support of software processes executing on the router. It will be apparent to those skilled in the art that other processor and memory means, including various computer readable media, may be used for storing and executing program instructions pertaining to the inventive technique described herein.

Figure 3:
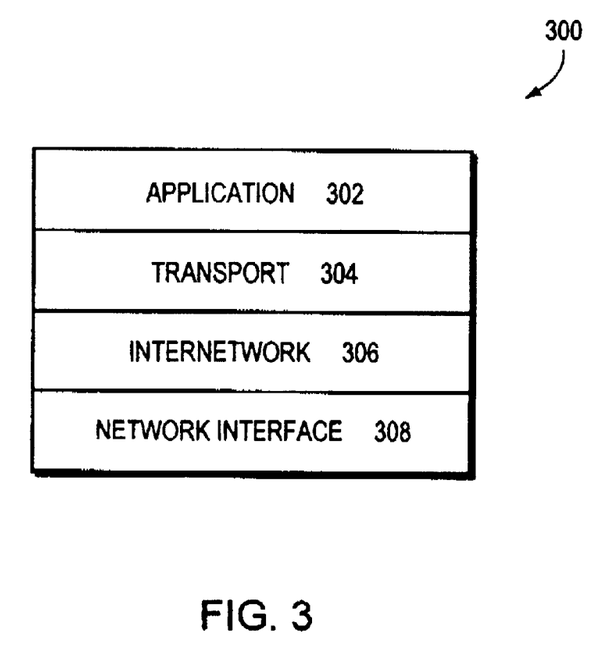
FIG. 3 is a schematic block diagram of a conventional protocol stack, such as the Internet communications protocol stack, within the interdomain router of FIG. 2.

A key function of the interdomain router is determining the next node to which a packet is sent; in order to accomplish such "routing," the interdomain routers 200 cooperate to determine preferred paths through the computer network 100. The routing function is preferably performed by an internetwork layer of a conventional protocol stack within each router. FIG. 3 is a schematic block diagram of a conventional protocol stack, such as the Internet communications protocol stack 300. The architecture of the Internet protocol stack 300 is represented by four layers termed, in ascending interfacing order, the network interface layer 308, the internetwork layer 306, the transport layer 304 and the application layer 302.

The lower network interface layer 308 is generally standardized and implemented in hardware and firmware, whereas the higher layers are typically implemented in the form of software. The primary internetwork layer protocol of the Internet architecture is the Internet protocol (IP). IP is primarily a connectionless protocol that provides for internetwork routing, fragmentation and reassembly of exchanged packets—generally referred to as "datagrams" in an Internet environment—and which relies on transport protocols for end-to-end reliability. An example of such a transport protocol is the Transmission Control Protocol (TCP) which is implemented by the transport layer and provides connection-oriented services to the upper layer protocols of the Internet architecture. The term TCP/IP is commonly used to denote the Internet architecture.

In particular, the internetwork layer 306 concerns the protocol and algorithms that interdomain routers 200 utilize so that they can cooperate to calculate paths through the computer network 100. An interdomain routing protocol, such as the Border Gateway Protocol (BGP), is used to perform interdomain routing (for the internetwork layer) through the computer network 100. The interdomain routers 200 (hereinafter neighboring peer routers) exchange routing and reachability information among the autonomous systems over a reliable transport layer connection, such as TCP. The BGP protocol "runs" on top of the transport layer to ensure reliable communication among the neighboring routers.

In order to perform routing operations in accordance with the BGP protocol, each interdomain router 200 maintains a conventional forwarding table 205 and a conventional routing table 206, the latter listing feasible paths to a particular network within an autonomous system. Two peer routers exchange routing information by each issuing one or more UPDATE messages after they establish a BGP peer connection (i.e., upon restart); thereafter the peer routers issue subsequent UPDATE messages when their routing tables change. The UPDATE messages are generated by an updating router to advertise changes to its routing table to its neighboring peer routers throughout the computer network. These routing updates allow the BGP routers of the autonomous systems to construct a consistent and up-to-date view of the network topology.

Figure 4:
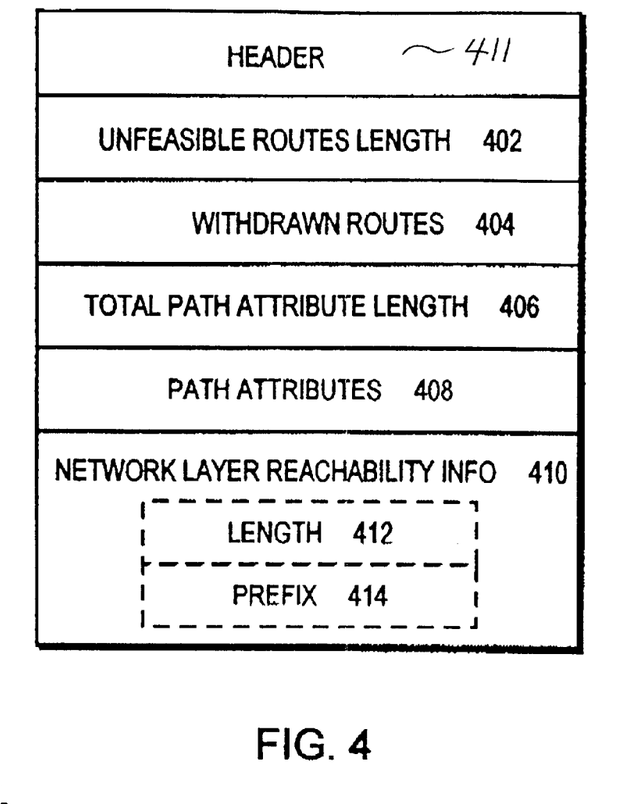
FIG. 4 is a schematic block diagram of a conventional update message, such as a border gateway protocol (BGP) UPDATE message that may be advantageously used with the present invention.

FIG. 4 is a schematic block diagram of a conventional BGP UPDATE message 400 comprising a plurality of fields appended to a header 411. An unfeasible routes length field 402 indicates the total length of a withdrawn routes field 404, which contains a list of IP address prefixes for the routes being withdrawn from service. A total path attribute length field 406 indicates the total length of a path attributes field 408 and a network layer reachability information field 410 contains a list of IP address prefixes to destinations advertised by the message 400. The format and function of the UPDATE message 400 are described in *RFC* 1771 and *Interconnections, Bridges and Routers.*

The network layer reachability information field 410, in turn, comprises a plurality of subfields containing information encoded as one or more 2-tuples of the form <length, prefix>. Specifically, the length subfield 412 contains information indicating the length (in bits) of the IP address prefixes, whereas the prefix subfield 414 contains the IP address prefixes followed by sufficient trailing bits to make the end of the field fall on an octet boundary.

Once a router 200 receives a full BGP routing table via one or more UPDATE messages 400 upon a restart, it performs a BGP route selection process to determine if the newly received routes are "preferred" to the currently used routes. That is, the router compares each newly received route with the contents of its routing table by essentially "walking-through" the routing table 206 to locate a route that has the same destination as the new route. Upon finding a match, the router applies a predetermined routing policy to determine which route is preferred by ranking the routes according to local criteria of the router. If the new route is preferred to the route stored in the routing table, the router completes the route selection process by updating the routing table and its forwarding table 205 with the new route and advertising that route (via the UPDATE message 400) to its neighbors, subject to a hold-down timer.

A problem with this approach is that after a restart, the BGP router may receive full routing table updates to the same destination from the many different neighbors. The sequence of UPDATE messages received at the router upon the restart has "global" implications in the sense that it may impact resources consumed not only at the router, but also at its neighbors. It is thus desirable to provide a technique for reducing resource consumption at the router when performing route selection decisions at restart. The present invention is directed to reducing consumption of resources on behalf of a router and its neighboring routers by deferring the point at which the router renders a BGP route selection decision. More specifically, the invention comprises a technique for deferring BGP route selection until all the neighbors finish updating the router with their full routing tables after a restart.

Figure 5:
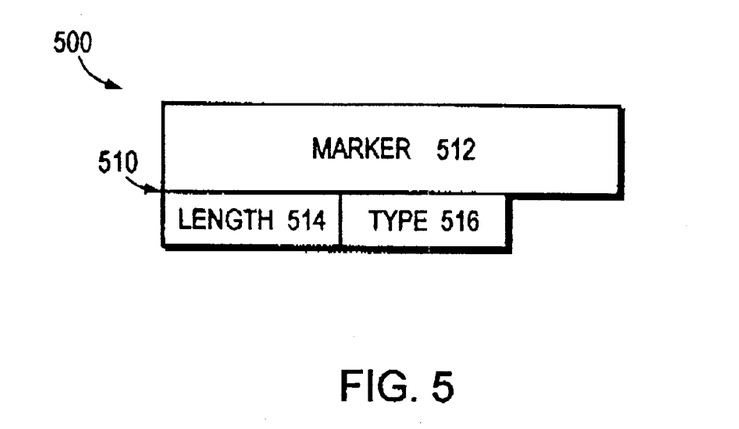
FIG. 5 is a schematic block diagram of a conventional keepalive message, such as a BGP KEEPALIVE message that may be advantageously used with the present invention.

According to the invention, a KEEPALIVE message is selectively issued after a restart to enable the router to detect that each of its neighbors has finished sending all of its routes. FIG. 5 is a schematic block diagram of a BGP KEEPALIVE message 500 comprising a message header 510. The header is of fixed size and includes a marker field 512 along with a length field 514 and a type field 516. The marker field 512 contains a value that the receiver of the message can predict by a computation specified as part of an authentication mechanism. The length field 514 indicates the total length of the message 500 including the header 510, whereas the type field 516 indicates the type code of the message, e.g., the KEEPALIVE message. The format and function of the KEEPALIVE message are also described in *RFC* 1771 and *Interconnections, Bridges and Routers*.

Since the invention pertains to restarts of BGP connections, the technique involves the use of a first KEEPALIVE message 500 exchanged between BGP neighboring peer routers. In other words, the invention applies after initial peer connections are established between a router and its neighboring peer routers and, moreover, only for full routing table exchanges. A neighbor does not send a first KEEPALIVE message after a restart until it finishes sending all of its full routing table updates to the router 200. When the neighbor has no further preferred routes to send, i.e., it has finished sending its full routing table, it may send the first KEEPALIVE message to the router. After detecting that it has received a full set of routes from each neighbor by receiving the first KEEPALIVE message 500 from each neighbor, the router 200 performs route selection procedures to select the preferred routes and advertises these routes to its neighbors.

For example, assume that a router 200 receives all of its routing updates back-to-back (i.e., within very short time sequences). That is, as soon as router 200 processes an UPDATE message 400 from a neighbor (e.g., N3) it receives an UPDATE message from another neighbor (e.g., N2). Router 200 processes the UPDATE message from N3 and determines that the route from N3 is the preferred route and, accordingly, the router 200 updates its routing table 206. But prior to updating its forwarding table 205, router 200 receives the UPDATE message 400 from N2 and proceeds to process that message.

Although router 200 still has to render three independent comparison operations among the routes for purposes of updating its routing table 206, it can defer rendering of a route selection decision (i.e., updating of its forwarding table 205) until updates are received from all of its neighbors N1–N3. In other words, router 200 does not have to update its forwarding table three times, but instead only has to update that table 205 once. Moreover by waiting until all neighbors send their full routing tables, router 200 does not have to readvertise preferred routes (based on the initial full routing table exchange) that were previously advertised to the neighboring peer routers. Since receiving of the neighbors' preferred routes, updating of the forwarding table based on the received routes and then advertising of the router's preferred routes consume resources on each router, those resources may be conserved if the route selection process can be deferred.

According to the invention, the first KEEPALIVE message 500 sent from, e.g. N3 to router 200 signifies to the latter router that a full routing table has been sent by that neighbor. Although router 200 can begin the route selection process at this time, the invention further contemplates waiting until all of the neighbors send their full routing tables. During an OPEN message exchange, the router 200 stores information (e.g., in memory 204) pertaining to the number of established neighboring peer connections; thus the router "knows" how many neighbors it has. The router 200 further knows when all of its neighbors have finished sending their full routing tables because it would have received a first KEEPALIVE message from each neighbor. Even though an optimized situation arises when the router waits until all of the neighbors finish sending their routing tables before starting its route selection process, substantial improvements in resource consumption can be realized if the router defers route selection until at least two neighbors have completed transfer of their full routing tables.

Deferring issuance of the first KEEPALIVE message does not violate BGP protocol specification; therefore BGP routers that are configured to implement the invention may advantageously interoperate with routers that do not implement the invention. To avoid deferring route selection indefinitely, the invention further comprises use of a specified timer. That is, a BGP router must perform BGP route selection procedures prior to expiration of the specified time period after restart, even if the router detects that not all of its BGP neighbors have completed sending of their routes to the router.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for reducing consumption of resources on a router in a computer network, the method comprising the steps of:
   receiving full routing table updates at the router from each of a plurality of neighboring peer routers upon a Border Gateway Protocol (BGP) restart;
   transmitting full routing table updates from the router to each neighboring peer router upon the BGP restart;
   receiving a first keepalive message from a particular router of the plurality of neighboring peer routers, the first keepalive message indicating that the particular router has finished providing its full routing table to the router; and
   deferring a route selection decision at the router until receiving the first keepalive message from each neighboring peer router, the received first keepalive message denoting transmission of a full routing table update by a respective neighboring peer router.

2. The method of claim 1 wherein the step of receiving full routing table updates comprises the step of receiving one or more update messages at the router from each neighboring peer router.

3. The method of claim 2 wherein the step of transmitting full routing table updates comprises the step of transmitting one or more update messages from the router to each neighboring peer router.

4. The method of claim 1, further comprising:
   in response to the BGP restart, each neighboring peer router indicating that it has transmitted a full update of its routing table by deferring transmission of any keepalive messages until the transmission of the full update of its routing tables, and then transmitting a first keepalive message;
   receiving the full routing table updates at the router from each of a plurality of neighboring peer routers upon the Border Gateway Protocol (BGP) restart; and
   receiving the first keepalive messages by the router from all of the neighboring peer routers denotes completion of full routing table updates by all of the neighboring peer routers.

5. The method of claim 4 further comprising the step of performing a BGP route selection procedure at the router in response to receiving the first keepalive message from each neighboring peer router.

6. The method of claim 4 further comprising the step of performing a BGP route selection procedure at the router prior to expiration of a specified timer, even if the router has not received the first keepalive message from each neighboring peer router.

7. Apparatus for reducing consumption of resources on a router in a computer network, the apparatus comprising:
   means for establishing a Border Gateway Protocol (BGP) peer connection between the router and each of a plurality of neighboring peer routers in the network;
   means for receiving full routing table updates at the router from each neighboring peer router;
   means for transmitting full routing table updates from the router to each neighboring peer router; and
   means for deferring a BGP route selection decision at the router until receiving a first keepalive message from each neighboring peer router, the received first keepalive message denoting transmission of a full routinable updated a respective neighboring peer router.

8. The apparatus of claim 7 wherein the means for receiving full routing table updates comprises means for receiving one or more update messages at the router from each neighboring peer router.

9. The apparatus of claim 8 wherein the means for transmitting full routing table updates comprises means for transmitting one or more update messages from the router to each neighboring peer router.

10. The apparatus of claim 7, further comprising:
    means for, in response to the BGP restart, each neighboring peer router indicating that it has transmitted a full update of its routing table by deferring transmission of any keepalive messages until the transmission of the full update of its routing tables, and then transmitting a first keepalive message.

11. The apparatus of claim 10 further comprising means for performing a BGP route selection procedure at the router in response to receiving the first keepalive message from each neighboring peer router.

12. The apparatus of claim 10 further comprising means for performing a BGP route selection procedure at the router prior to expiration of a specified timer, even if the router has not received the first keepalive message from each neighboring peer router.

13. A computer readable medium containing executable program instructions for reducing consumption of resources on a router and its neighboring peer routers in a computer network, the executable program instructions comprising program instructions for:
    establishing a Border Gateway Protocol (BGP) peer connection between the router and each neighboring peer router;
    providing full routing table updates between the router and each neighboring peer router; and
    deferring a BGP route selection decision at the router until receiving a first keepalive message after establishing the BGP peer connection from each neighboring peer router, the received first keepalive message denoting transmission of a full routing table update by a respective neighboring peer router.

14. The computer readable medium of claim 13 wherein the program instruction for providing full routing table updates comprises the program instruction for receiving one or more update messages at the router from each neighboring peer router.

15. The computer readable medium of claim 13 further comprising:
    in response to the BGP restart, each neighboring peer router indicating that it has transmitted a full update of its routing table by deferring transmission of any keepalive messsages until the transmission of the full update of its routing tables, and then transmitting a first keepalive message.

16. The computer readable medium of claim 15 further comprising program instructions for performing a BGP route selection procedure at the router in response to the step of receiving the first keepalive message from each neighboring peer router.

17. The computer readable medium of claim 15 further comprising program instructions for performing a BGP route selection procedure at the router prior to expiration of a specified timer, even if the router has not received the first keepalive message from each neighboring peer router.

18. Electromagnetic signals propagating on a computer network, comprising: said electromagnetic signals carrying instructions for execution on a processor for the practice of the method of claim 1.

19. A router, comprising:
   a first network interface to receive full routing table updates from each of a plurality of neighboring peer routers upon a Border Gateway Protocol (BGP) restart;
   a second network interface to transmit full routing table updates to each neighboring peer router upon the BGP restart; and
   a processor and a memory to defer a BGP route selection decision until receiving a first keepalive message after establishing the BGP peer connection from each neighboring peer router, the first keepalive message from each neighboring peer router indicating that the neighboring peer router has finished transmitting its full routing table updates to the router.

20. The apparatus of claim 19 further comprising:
   a timer, wherein the processor and the memory perform a BGP route selection procedure at the router prior to expiration of the timer, even if the router has not received the keepalive message after the BGP restart from each neighboring peer router, the keepalive message from a neighboring peer router indicating that the neighboring peer router has transmitted a full update of its router tables.

21. A system of routers in a computer network, the system comprising:
   a first router to receive a full routing table update from each of a plurality of neighboring peer routers upon a Border Gateway Protocol (BGP) restart of the first router;
   a second router, of the plurality of neighboring peer routers, to transmit full routing table updates to the first router upon the BGP restart; and
   a processor and a memory in the first router to defer a BGP route selection decision until receiving a first keepalive message after establishing the BGP peer connection from each neighboring peer router, the first keepalive message from each neighboring peer router indicating that the neighboring peer router has finished transmitting its full routing table updates to the router.

22. The system of claim 21 further comprising:
   in response to the BGP restart, the second router indicating that it has transmitted a full update of its routing table by deferring transmission of any keepalive messages until the transmission of the full update of its routing tables, and then transmitting a first keepalive message;
   a timer within the first router, the processor and the memory in the first router performing a BGP route selection procedure at the first router prior to expiration of the timer, even if the first router has not received the keepalive message from each neighboring peer router.

23. A method for reducing consumption of resources on a system of routers in a computer network, the method comprising the steps of:
   receiving full routing table updates at a first router from each of a plurality of neighboring peer routers upon a Border Gateway Protocol (BGP) restart of the first router;
   transmitting full routing table updates from a second router of the plurality of neighboring peer routers to the first router upon the BGP restart; and
   deferring a BGP route selection decision at the first router until receiving a first keepalive message from each neighboring peer router, the received first keepalive message denoting transmission of a full routing table update by a respective neighboring peer router.

24. The method of claim 23 further comprising:
   in response to the BGP restart, the second router indicating that it has transmitted a full update of its routing table by deferring transmission of any keepalive messages until the transmission of the full update of its routing tables, and then transmitting a first keepalive message;
   performing a BGP route selection procedure at the first router in response to receiving the first keepalive message from each neighboring peer router.

25. The method of claim 24 further comprising:
   performing a BGP route selection procedure at the first router prior to expiration of a specified timer, even if the first router has not received the keepalive message from each neighboring peer router.

26. A computer readable media, comprising:
   said computer readable media having instructions written thereon for execution on a processor for the practice of the method of claim 1 or claim 23.

27. Electromagnetic signals propagating on a computer network, comprising:
   said electromagnetic signals carrying instructions for execution on a processor for the practice of the method of claim 23.

* * * * *